(12) United States Patent
Vyas et al.

(10) Patent No.: US 9,658,933 B2
(45) Date of Patent: May 23, 2017

(54) AUTOMATICALLY MODIFYING A TEST FOR A PROGRAM ON MULTIPLE ELECTRONIC DEVICES

(71) Applicant: salesforce.com, inc., San Francisco, CA (US)

(72) Inventors: Kunal Vyas, Fremont, CA (US); Vijay Singh, Fremont, CA (US); Nataraj Paila, Fremont, CA (US); Scott Glaser, Dublin, CA (US)

(73) Assignee: SALESFORCE.COM, INC., San Francisco, CA (US)

( * ) Notice: Subject to any disclaimer, the term of this patent is extended or adjusted under 35 U.S.C. 154(b) by 894 days.

(21) Appl. No.: 13/930,173

(22) Filed: Jun. 28, 2013

(65) Prior Publication Data

US 2014/0005974 A1    Jan. 2, 2014

Related U.S. Application Data

(60) Provisional application No. 61/667,013, filed on Jul. 2, 2012.

(51) Int. Cl.
*G06F 19/00* (2011.01)
*G06F 11/263* (2006.01)
*G06F 11/36* (2006.01)

(52) U.S. Cl.
CPC ........ *G06F 11/263* (2013.01); *G06F 11/3664* (2013.01); *G06F 11/3688* (2013.01)

(58) Field of Classification Search
CPC .. G06F 11/26; G06F 11/2205; G06F 11/2273; G01R 31/31704; G01R 31/318314; G01R 31/318583; G01R 31/2834; G05B 2219/45031; Y10S 706/919

See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |

(Continued)

*Primary Examiner* — Elias Desta
(74) *Attorney, Agent, or Firm* — Lorenz & Kopf, LLP

(57) ABSTRACT

A system and method for configuring a test for a program is provided. The method, for example, may include receiving, by a processor, an identification of an electronic device, retrieving, by the processor, a configuration of the electronic device from a memory, modifying, by the processor, at least one step of the test based upon the configuration of the electronic device.

14 Claims, 3 Drawing Sheets

(56) References Cited

U.S. PATENT DOCUMENTS

Figure 1:
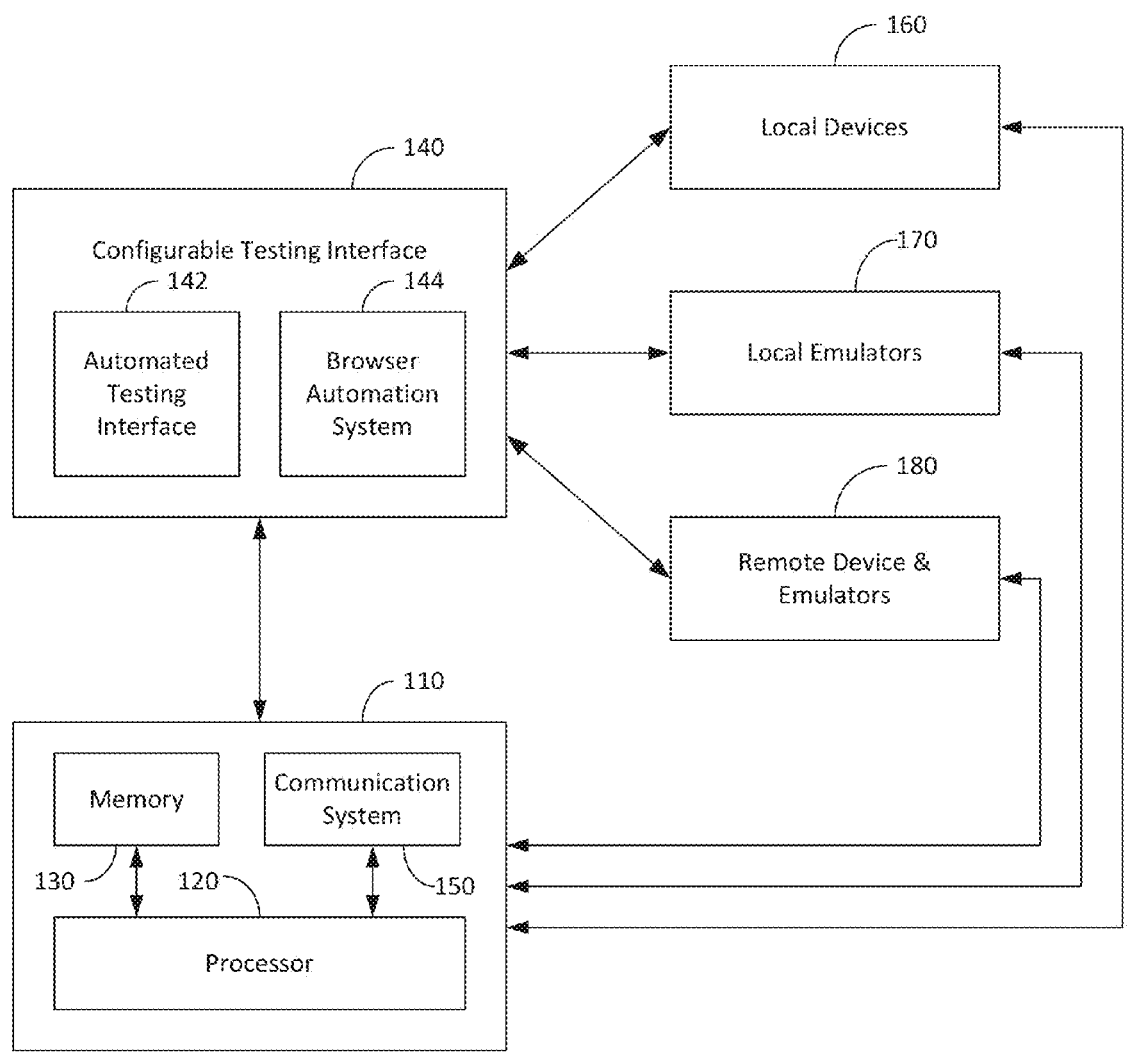

| | | |
|---|---|---|
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,421,793 B1 * | 7/2002 | Lester ............... G06F 11/2733 714/37 |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,988,895 B1 * | 1/2006 | Lamarche ............... G09B 7/00 434/323 |
| 7,062,502 B1 | 6/2006 | Kesler |
| 7,165,191 B1 * | 1/2007 | Vakrat ............... G06F 11/3688 714/38.1 |
| 7,340,411 B2 | 3/2008 | Cook |
| 7,401,094 B1 | 7/2008 | Kesler |
| 7,620,655 B2 | 11/2009 | Larsson et al. |
| 7,698,160 B2 | 4/2010 | Beaven et al. |
| 7,983,871 B2 * | 7/2011 | Kimbrough ........ G01R 31/2894 702/119 |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0022167 A1 * | 1/2008 | Chung ............. G01R 31/31851 714/718 |

\* cited by examiner

AUTOMATICALLY MODIFYING A TEST FOR A PROGRAM ON MULTIPLE ELECTRONIC DEVICES

CROSS-REFERENCE TO RELATED APPLICATION(S)

This application claims the benefit of U.S. provisional patent application serial number 61/667,013, filed Jul. 2, 2012, the entire content of which is incorporated by reference herein.

TECHNICAL FIELD

The following relates to program testing and more particularly to automatically customizing a test based upon a device to be tested.

BACKGROUND

Electronic devices, such as cellular phones, tablets, televisions and personal computers, come in a variety of sizes and shapes and run a variety of different operation system. Cellular phones, for example, have varying screen sizes, screen length-to-width ratios, operating systems, web browsers and a variety of other factors which force developers to customize programs such that the programs properly function on each unique cellular phone. Testing the program on each electronic device can become cumbersome and time consuming as custom tests generally have to be written for each electronic device.

DESCRIPTION OF THE DRAWING FIGURES

Figure 2:
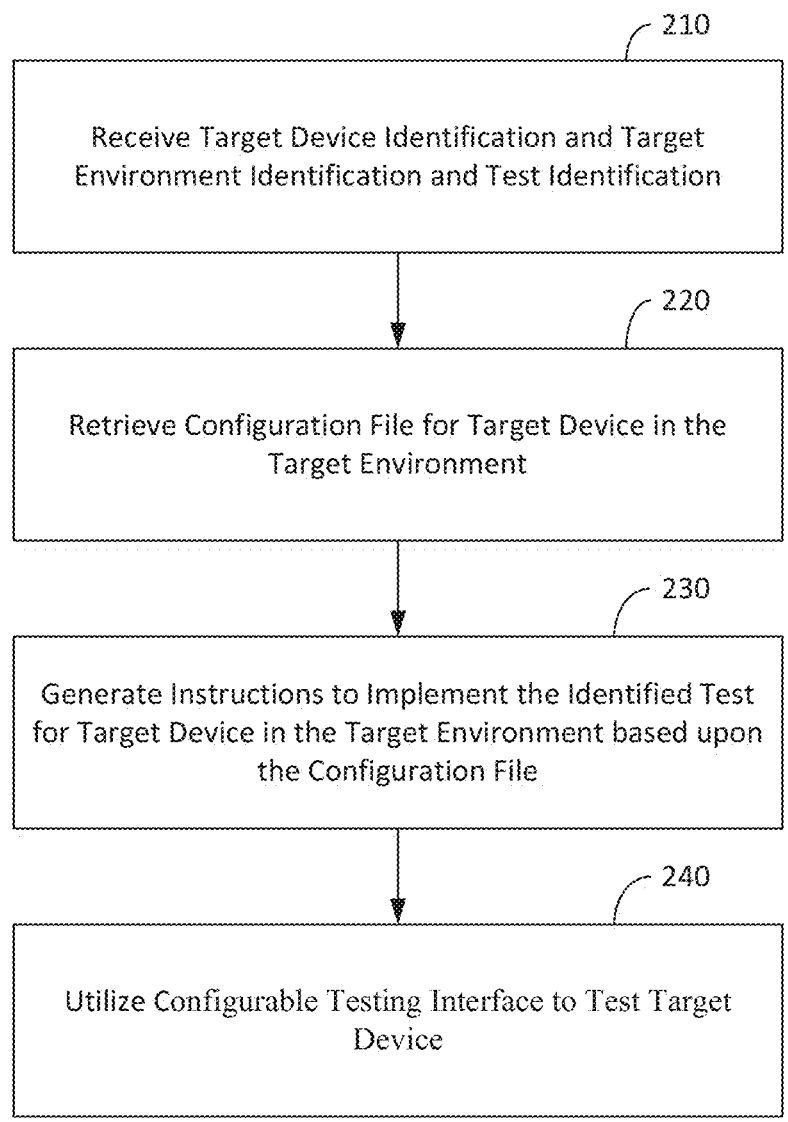
Figure 3:
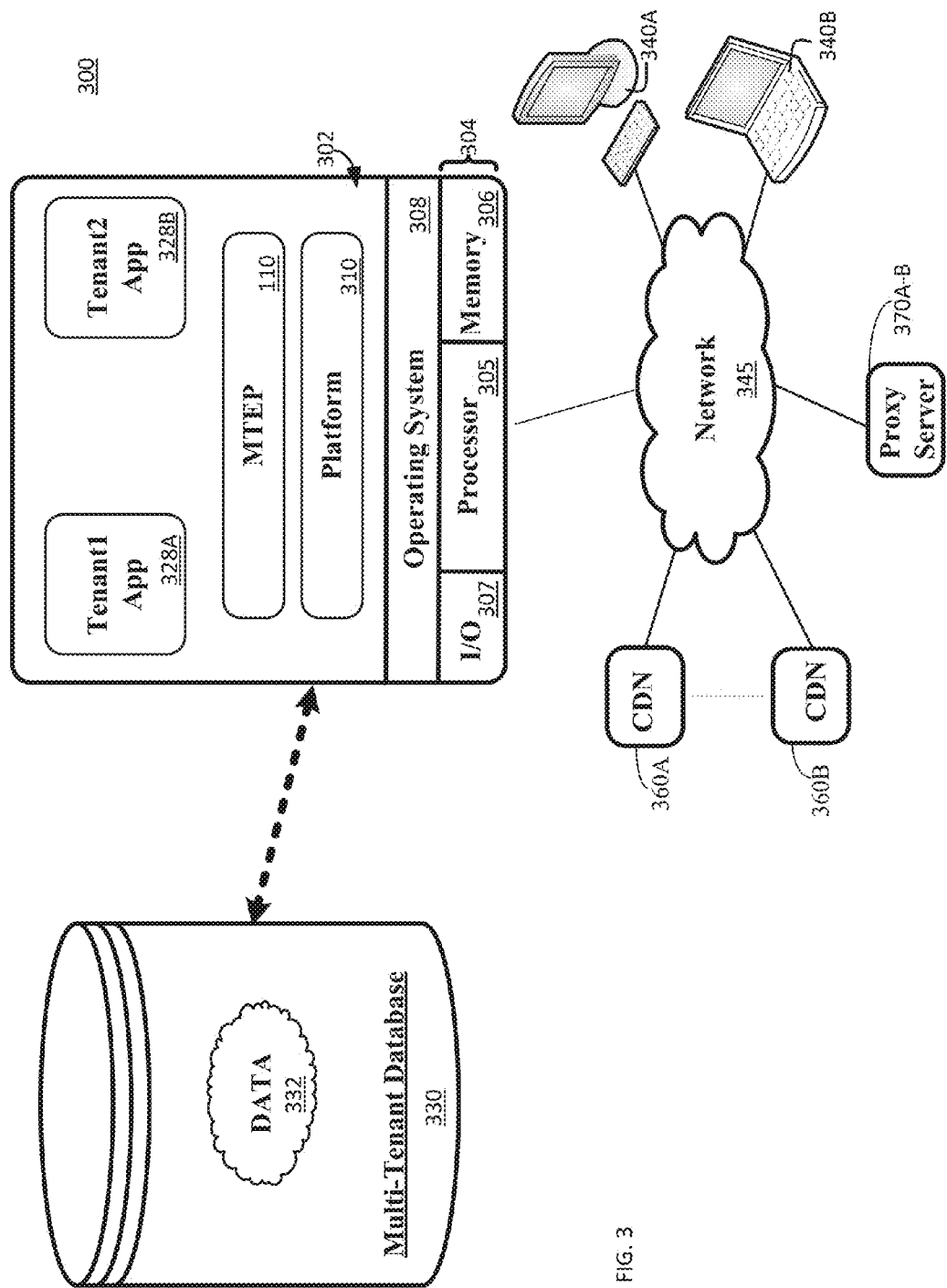

Exemplary embodiments will hereinafter be described in conjunction with the following drawing figures, wherein like numerals denote like elements, and FIG. 1 is a block diagram of a test environment, in accordance with an embodiment;

FIG. 2 is a flow diagram illustrating an exemplary method for operating a test environment, in accordance with an embodiment; and FIG. 3 illustrates an exemplary multi-tenant application system in accordance with an embodiment.

DETAILED DESCRIPTION

According to various exemplary embodiments, systems and methods are provided to which allow a developer to easily test programs on a multitude of different electronic devices and software platforms. Devices can vary in a variety of different ways which require a developer to alter a program to function properly on each electronic device. Accordingly, the system presented herein, for example, includes a configuration file for each electronic device. The configuration file includes details on how each device varies. The system further includes a processor which analyzes a test step and modifies the test step for the specific electronic device based upon the configuration file. Accordingly, while the device and program may change, the developer can use the system and method disclosed herein to test the program on any device without having to write a customized test for each device.

FIG. 1 is a block diagram of a test environment 100, in accordance with an embodiment. The test environment includes a mobile test environment provisioning system 110, hereinafter referred to as the MTEP system 110. The MTEP system 110 can be implemented using any suitable computer-based platform, system, or device. Accordingly, the MTEP system 110 includes a processor 120. The processor 120 may be a central processing unit (CPU), an application specific integrated circuit (ASIC), a field programmable gate array (FPGA), a microcontroller, a graphics processing unit (GPU), a physics processing unit (PPU), or any other type of logic device or any combination thereof. The processor 120 is coupled to a memory 130. The memory 130 may be any type of non-volatile memory, such as a hard drive or a computer-readable memory, such as a flash drive, a CD, a DVD, a Blu-ray disk or any other type of computer-readable memory.

The environment 100 further includes a configurable testing interface 140. In one embodiment, for example, the configurable testing interface 140 may be part of the MTEP system 110. In other embodiments, for example, the configurable testing interface 140 may be in a remote system hosted on a server (not illustrated). In this embodiment, for example, the MTEP system 110 and configurable testing interface 140 may communicate via a communication system 150 such as a local area network (LAN), a Wi-Fi connection, a cellular connection, a satellite connection or any other type of data connection system.

In one embodiment, for example, the configurable testing interface 140 includes an automated testing interface 142. The automated testing interface 142 may automate a test. In other words, the automated testing interface 142 may automatically interact with a program according to a predefined series of steps. The testing steps vary depending upon the program, however, testing steps could include navigating menus, testing software functions, testing software/hardware interactions preparing software and or hardware for test with relevant configuration, validating of software/hardware response or behavior, or the like. The configurable testing interface 140 may also capture the results of the test and create a report.

In one embodiment, for example, the configurable testing interface 140 may also include a browser automation system 144. In this embodiment, the automated testing interface 142 may utilize the browser automation system 144 to perform the test when the program to be tested operates in a browser, for example, if the program was written in HTML 5. The browser automation system 144 allows a test to interact with the program as if the test were a user, enabling, for example, simulated mouse, touchpad or touchscreen interface movements and inputs (e.g., left clicks, right clicks, scrolls, etc.).

As discussed in further detail below, the MTEP system 110 sends instructions to the configurable testing interface 140 to test one or more local devices 160, local emulators 170 or remote devices or remote emulators 180.

The local devices 160 may be mobile devices or other electronic devices, including, but not limited to, cellular phones, tablet computers, laptop computers, desktop computers, televisions, electronic readers (e-readers), or any other type of electronic device having a web browser or internet connection. The one or more local devices 160 may be communicatively coupled to the MTEP system 110 and/or the configurable emulator interface 140 via a local area network (LAN) or a Wi-Fi connection.

The local emulators 170 may emulate any electronic device including, but not limited to, cellular phones, tablet computers, laptop computers, desktop computers, televisions, electronic readers (e-readers), or any other type of electronic device having a web browser or internet connection. As with the local devices 160, local emulators 170 may be communicatively coupled to the MTEP system 110 and/or the configurable emulator interface 140 via a local area network (LAN) or a Wi-Fi connection.

The remote devices or remote emulators 180 may be actual or virtual devices including, but not limited to, cellular phones, tablet computers, laptop computers, desktop computers, televisions, electronic readers (e-readers), or any other type of electronic device having a web browser or internet connection. The remote devices or remote emulators 180 may be communicatively coupled to the MTEP system 110 and/or the configurable emulator interface 140 via the communication system 150.

A configuration file for each of the local devices 160, local emulators 170 or remote devices or remote emulators 180 is stored in the memory 130. The configuration file may include, for example, a device location (i.e., local or cloud), a device type configuration (i.e., emulator or physical, a device operating system configuration (e.g., iOS, Android, Windows, BlackBerry, an orientation configuration (i.e., landscape or portrait).

Each local device 160, local emulator 170 or remote device or remote emulator 180 includes at least one program. The program could be written in any computing language, including, but not limited to, java, C, C++, C#, flash, HTML 5, or any other computer language. HTML 5, for example, is a markup language for structuring and presenting content in a browser. Accordingly, applications or programs written in HTML 5 would be similar across a variety of mobile or non-mobile platforms, including, but not limited to, Apple iOS, Apple OS, Google Android, Google Chrome, Microsoft Windows Phone, Microsoft Windows, BlackBerry 10, Ubuntu Touch, Unix, MeeGo, Linux, or any other mobile or non-mobile platform. Furthermore, as programs written in HTML 5 run in a web browser environment, the programs would be similar across a variety of web browsers, including, but not limited to, Internet Explorer, Firefox, Chrome, Safari, Opera, or any other web browser. Typically, however, developers must write custom code for each operating system. In some instances, the developer may have to write custom code for each device even if the devices have the same operating system.

Typically a test procedure for the program would also have to be customized for each electronic device. For example, electronic devices have different screen sizes, screen size ratios (i.e., length-width ratio), or orientations. Accordingly, a particular input interface (e.g., a menu, function button, or the like) in the program or application may be located at a different space in various electronic devices. Furthermore, different electronic devices may utilize different procedures for accessing functions, such as a camera, data connection, location based services, touch events or scanner, may have different privacy or security settings, and may be operating under various driver or firmware versions, operating mode—such as airplane mode, do not disturb mode, 3G or Wi-Fi mode, or the like. For example, some devices may require a user to give permission for the program to access certain functions, while other devices may not. As discussed in further detail below, the MTEP system 110 automatically customizes a test for an electronic device such that a developer only needs to write a single testing program, rather than writing a custom test program for every possible electronic device, operating system, web browser, driver, firmware combination.

FIG. 2 is a flow diagram illustrating an exemplary method 200 for operating a test environment, in accordance with an embodiment. In one embodiment, for example, the instructions for operating the test environment may be stored in a computer-readable medium, such as the non-transitory memory 130 illustrated in FIG. 1. A processor, such as the processor 120 illustrated in FIG. 1, first receives a target device identification, a target environment identification and a test identification. (Step 210). The target device identification corresponds to a make and/or model of the electronic device, the target environment corresponds to a location of the target device or emulator as discussed above, and the test identification corresponds to the test to be run. For example, a user may input: iPad/localaddressX/TestY to indicate that the test Y should be customized and run on an iPad located locally at address X. One of ordinary skill in the art would recognize that a variety of input systems could be used to collect the target device identification, target environment identification and test identification information from a user. In another embodiment, for example, a user may merely input a device and optionally an operating system or firmware version. In this embodiment, for example, a list of the location of devices and their corresponding configurations may be stored in the memory 130. Accordingly, the processor, upon receipt of the device information, determines one or more locations of corresponding devices to route the test to.

The test identification corresponds to a test for the program written by the developer. In one embodiment, for example, the test may be stored in the memory 130. In other embodiments, for example, the test may be stored in a memory of the testing interface 140. The test itself might vary dramatically depending upon the program. However, in general, the test would include at least one testing step including an input corresponding with an interaction with the program and a procedure for capturing a response, whether expected or unexpected. Accordingly, if, for example, the program is a quick response code (QR) reader, the testing procedures may include navigating various menus or inputs including an instruction to interact with a camera of the device.

The processor then retrieves a configuration file for the target device in the target environment. (Step 220). As discussed above, the configuration file includes the data needed by the processor to set up and customize the test for the given device in the given environment. The processor then generates the instructions to implement the identified test for the target device in the target environment. (Step 230). As discussed above, electronic devices may have different screen sizes, ratios or orientations, may utilize different procedures for accessing functions and may have different security settings. The processor, based upon the configuration file, modifies the identified test to compensate for the specific device. In one embodiment, for example, the test has a hook to the processor through an annotation. The annotation captures the change in the form of a configuration and flags it to the processor to setup the test for execution. For example, a test that needs to run on an iPad/iOS 6.0 located in the cloud will have a hook in the following format, @Listeners(TestAnnotationDriver.class) @MobileTestConfig(targetDevice=TargetDevice.IPAD_5_0, targetEnvironment=TargetEnvironment.SAUCELABS)).

Furthermore, as discussed above, the device to be tested may be an actual device or an emulator and may be communicatively located on a local network or an external network relative to the developer. Accordingly, the processor, based upon the internet protocol (IP) address (i.e., the location) of the device to be tested, customizes the test instructions such that the test instructions are directed towards the identified electronic device. In one embodiment, for example, the test may be stored on the memory 130.

Accordingly, in this embodiment, the processor 120 may customize each test instruction, if necessary, before send the test instruction to the testing interface 140. In another embodiment, for example, the testing interface 140 may transmit a test step to the processor 120. The processor 120 would then determine if the test step requires modification based upon the configuration of the identified electronic device.

The processor then utilizes a configurable testing interface to test the target device. (Step 240). As discussed above, the configurable testing interface 140 may include an automated testing interface and/or a browser automation system to implement the test. In one embodiment, for example, the MTEP system 110 configures the test in real time. In this embodiment, for example, the processor, prior to sending instructions for a particular testing step to the configurable testing interface 140, will determine if the step requires customization for a particular electronic device. If the testing step requires customization for a particular electronic device, the processor modifies the base test procedure based upon the configuration file for the identified electronic device.

Accordingly, the MTEP system 110 allows a developer to easily test a multitude of different electronic devices or emulators, located locally or remotely, having a variety of system specs, driver versions, firmware versions, operating systems and browsers, with a single test.

In one embodiment, for example, the MTEP system 110 may be implemented in a multi-tenant application system. FIG. 3 illustrates an exemplary multi-tenant application system 300 in accordance with an embodiment. The multi-tenant application system 300 suitably includes a server 302 that dynamically creates virtual applications 328A-B based upon data 332 from a common database 330 that is shared between multiple tenants. Data and services generated by the virtual applications 328A-B are provided via network 345 to any number of client devices 340A-B, as desired. Each virtual application 328A-B is suitably generated at run-time using a common platform 310 that securely provides access to data 332 in database 330 for each of the various tenants subscribing to system 300. The multi-tenant application system 300 may also include any number of content delivery networks ("CDNs") 360A-B, as desired. The CDNs 160A-B may contain a copy of at least some of the data 332 which may be accessible via the network 345. The multi-tenant application system 300 may also employ any number of proxy servers 370A-B which may be used to direct traffic between the server 302 and the CDNs 360A-B.

A "tenant" generally refers to a group of users that shares access to common data within database 330. Tenants may represent customers, customer departments, business or legal organizations, and/or any other entities that maintain data for particular sets of users within system 300. Although multiple tenants may share access to a common server 302 and database 330, the particular data and services provided from server 302 to each tenant can be securely isolated from those provided to other tenants, as described more fully below. However, the applications 328A-B, which are generally written by the customer, may also share common application data in the database 330. The multi-tenant architecture allows different sets of users to share functionality without necessarily sharing each other's data 332. For example, generically written test steps for applications could be stored in the database 330, allowing customers to quickly build testing programs.

Database 330 is any sort of repository or other data storage system capable of storing and managing data 332 associated with any number of tenants. Database 330 may be implemented using conventional database server hardware. In various embodiments, database 330 shares processing hardware 304 with server 302. In other embodiments, database 330 is implemented using separate physical and/or virtual database server hardware that communicates with server 302 to perform the various functions described herein.

Server 302 is implemented using one or more actual and/or virtual computing systems that collectively provide a dynamic application platform 310 for generating virtual applications 328A-B. Server 302 operates conventional computing hardware 304, such as a processor 305, memory 306, input/output features 307 and the like. Processor 305 may be implemented using one or more of microprocessors, microcontrollers, processing cores and/or other computing resources spread across any number of distributed or integrated systems, including any number of "cloud-based" or other virtual systems. Memory 306 represents any non-transitory short or long term storage capable of storing programming instructions for execution on processor 305, including any sort of random access memory (RAM), read only memory (ROM), flash memory, magnetic or optical mass storage, and/or the like. Input/output features 307 represent conventional interfaces to networks (e.g., to network 345, or any other local area, wide area or other network), mass storage, display devices, data entry devices and/or the like. In a typical embodiment, application platform 310 gains access to processing resources, communications interfaces and other features of hardware 304 using any sort of conventional or proprietary operating system 308. As noted above, server 302 may be implemented using a cluster of actual and/or virtual servers operating in conjunction with each other, typically in association with conventional network communications, cluster management, load balancing and other features as appropriate.

The term "exemplary" is used herein to represent one example, instance or illustration that may have any number of alternates. Any implementation described herein as "exemplary" should not necessarily be construed as preferred or advantageous over other implementations.

Although several exemplary embodiments have been presented in the foregoing description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. A method for configuring a test for a program, comprising:
   receiving, by a processor, an identification of an electronic device configured to operate the program;
   retrieving, by the processor, a configuration of the electronic device from a memory, the configuration including a screen size ratio, a device web browser and a device operating system;
   automatically modifying, by the processor, at least one step of the test based upon the screen size ratio, the device web browser and the device operating system of the electronic device.

2. The method according to claim 1, further comprising:
   receiving, by the processor, a location of the electronic device; and automatically modifying, by the processor, the at least one step of the test based upon the location of the electronic device.

3. The method according to claim 1, further comprising determining the at least one step of the test requires modification based upon the configuration of the electronic device.

4. The method according to claim 1, further comprising:
determining, by the processor, a location of the electronic device based upon the identification of the electronic device; and
automatically modifying, by the processor, the at least one step of the test based upon the location of the electronic device.

5. The method according to claim 1, wherein the electronic device is an emulator.

6. A system for configuring a test for a program on a plurality of electronic devices, comprising:
a memory configured to store a respective configuration for each of the plurality of electronic devices, the configuration including a screen size ratio, a device web browser and a device operating system associated with each of the plurality of electronic devices;
a communication system; and
a processor communicatively coupled to the memory and the communication system, the processor configured to:
receive an identification for one of the plurality of electronic devices;
retrieve a corresponding configuration of the one of the plurality of electronic devices from the memory; and
automatically modify at least one step of the test based upon the screen size ratio, the device web browser and the device operating system of the one of the plurality of electronic devices.

7. The system of claim 6, wherein the processor is further configured to retrieve the test from the memory.

8. The system of claim 6, wherein the processor is further configured to retrieve at least one step of the test from the communication.

9. The system of claim 6, wherein the processor is further configured to:
receive a location of the one of the plurality of electronic devices; and
automatically modify the at least one step of the test based upon the location of the one of the plurality of electronic devices.

10. The system of claim 6, wherein the processor is further configured to determine the at least one step of the test requires modification based upon the configuration of the one of the plurality of electronic devices.

11. The system of claim 6, wherein the processor is further configured to determine a location of the one of the plurality of electronic devices based upon the identification of the one of the plurality of electronic devices; and
automatically modifying, by the processor, the at least one step of the test based upon the location of the one of the plurality of electronic devices.

12. The system of claim 6, wherein the program is a HTML 5 program and the test is performed by a browser automation system.

13. The system of claim 6, wherein the processor is further configured to perform the test in an emulator for the one of the plurality of electronic devices.

14. A computer-readable medium storing instructions which when executed by a processor cause the processor to:
determine an identification of an electronic device configured to operate a program;
retrieve a configuration of the electronic device from a memory, the configuration including a screen size ratio, a device web browser and a device operating system associated with the electronic devices; and
automatically modify at least one step of a test for the program based upon the screen size ratio, the device web browser and the device operating system of the electronic device.

* * * * *